(12) United States Patent
Ochi et al.

(10) Patent No.: US 10,969,016 B2
(45) Date of Patent: Apr. 6, 2021

(54) SEALING STRUCTURE

(71) Applicant: TOYOTA JIDOSHA KABUSHIKI KAISHA, Toyota (JP)

(72) Inventors: Yuta Ochi, Toyota (JP); Michito Shirakawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 16/237,401

(22) Filed: Dec. 31, 2018

(65) Prior Publication Data

US 2019/0219174 A1 Jul. 18, 2019

(30) Foreign Application Priority Data

Jan. 17, 2018 (JP) .............................. JP2018-005629

(51) Int. Cl.
*F16J 15/34* (2006.01)
*F16J 15/3204* (2016.01)
(Continued)

(52) U.S. Cl.
CPC ...... *F16J 15/3468* (2013.01); *F02M 51/0685* (2013.01); *F02M 55/004* (2013.01); *F02M 55/005* (2013.01); *F02M 55/02* (2013.01); *F02M 55/025* (2013.01); *F02M 61/1866* (2013.01); *F16J 15/002* (2013.01);
(Continued)

(58) Field of Classification Search
CPC .. F16J 15/3468; F16J 15/3464; F16J 15/3472; F16J 15/3488; F16J 15/002; F16J 15/00; F16J 15/162; F16J 15/40; F16J 15/02; F16J 15/46; F16J 15/48; F16J 15/166; F16J 15/3204; F16J 15/3216; F16J 15/322; F02M 51/0685; F02M 55/004; F02M 55/005; F02M 55/002;
(Continued)

(56) References Cited

U.S. PATENT DOCUMENTS 6,263,863 B1 * 7/2001 Giovannini .......... F02M 55/025
123/470
8,763,588 B2 7/2014 Sugiyama et al.
(Continued)

FOREIGN PATENT DOCUMENTS

DE 112010005428 T5 1/2013
JP 561-001776 U 1/1986
(Continued)

*Primary Examiner* — Nathan Cumar
(74) *Attorney, Agent, or Firm* — Oliff PLC

(57) ABSTRACT

A sealing structure includes an O-ring and a back-up ring. An outer diameter of the back-up ring is smaller than an inner diameter of a mounting portion of a delivery pipe. An inner diameter of the back-up ring is gradually increased from a pressure-receiving surface toward a seating surface, and is greater than an outer diameter of a fuel introducing portion of a fuel injection valve. In a section of the back-up ring, an edge angle defined between the pressure-receiving surface and an inner circumferential surface is smaller than a gap angle defined between the pressure-receiving surface and a tapered outer surface of a tapered portion in the fuel introducing portion. A dimension of the seating surface in the back-up ring is shorter than a dimension in an end surface.

10 Claims, 7 Drawing Sheets

(51) Int. Cl.
  *F16J 15/00* (2006.01)
  *F16H 15/16* (2006.01)
  *F02M 51/06* (2006.01)
  *F02M 61/18* (2006.01)
  *F16J 15/16* (2006.01)
  *F02M 55/02* (2006.01)
  *F02M 55/00* (2006.01)

(52) U.S. Cl.
  CPC ......... *F16J 15/166* (2013.01); *F16J 15/3204* (2013.01); *F02M 2200/856* (2013.01)

(58) Field of Classification Search
  CPC ............. F02M 55/025; F02M 61/1866; F02M 61/1873; F02M 61/1886; F02M 61/1893; F02M 2200/856
  USPC ....................................................... 277/399
  See application file for complete search history.

(56) References Cited

U.S. PATENT DOCUMENTS

| | | |
|---|---|---|
| 2005/0115546 A1 | 6/2005 | Liskow |
| 2013/0014719 A1 | 1/2013 | Sugiyama et al. |
| 2016/0281857 A1* | 9/2016 | Beckmann ........... F02M 55/005 |
| 2017/0097094 A1* | 4/2017 | Monma .................. F16J 15/166 |

FOREIGN PATENT DOCUMENTS

| | | |
|---|---|---|
| JP | H09-222058 A | 8/1997 |
| JP | 2006-138269 A | 6/2006 |
| JP | 2007-255697 A | 10/2007 |
| JP | 2013-253566 A | 12/2013 |
| KR | 10-2016-0082509 A | 7/2016 |

\* cited by examiner

SEALING STRUCTURE

INCORPORATION BY REFERENCE

The disclosure of Japanese Patent Application No. 2018-005629 filed on Jan. 17, 2018 including the specification, drawings and abstract is incorporated herein by reference in its entirety.

BACKGROUND OF THE INVENTION

1. Technical Field

The present disclosure relates to a sealing structure to seal a gap between a fuel injection valve and a delivery pipe.

2. Description of Related Art

There has been known a sealing structure disposed between each of fuel injection valves and a fuel delivery pipe. In such a sealing structure, an O-ring is pressed against the fuel injection valve due to fuel pressure, the O-ring is then deformed, and a gap between the fuel injection valve and the fuel delivery pipe is thereby filled.

A sealing structure disclosed in Japanese Patent Application Publication No. 9-222058 includes: an O-ring sealing a gap between each fuel injection valve and the fuel delivery pipe; and a back-up ring disposed between the O-ring and the fuel injection valve so as to assist sealing by the O-ring. The back-up ring is press-fitted into the fuel delivery pipe so as to eliminate generation of a gap that allows the O-ring to enter between the fuel injection valve and the back-up ring.

SUMMARY

In the above-described structure in which the back-up ring is press-fitted into the fuel delivery pipe, the back-up ring be press-fitted with an angle inclined relative to the central axis of the fuel delivery pipe, for example. In this case, even when fuel pressure is applied via the O-ring to the back-up ring, the back-up ring and the fuel injection valve might fail to be coaxially arranged. Consequently, there is a possibility that a gap is generated between the back-up ring and the fuel injection valve. Particularly in such a condition that the O-ring has a small amount of deformation, fuel pressure to be transmitted to the back-up ring via the O-ring is likely to vary in the circumferential direction, which makes the inclination of the back-up ring more difficult to be canceled. Consequently, there occurs an allowance for generating a gap that the O-ring can enter, which might result in deterioration of the sealing performance.

A first aspect of the present disclosure relates to a sealing structure. The sealing structure is applied to a fuel supply apparatus of an internal combustion engine. The fuel supply apparatus includes a delivery pipe, and a fuel injection valve. The delivery pipe includes a mounting portion into which the fuel injection valve is inserted, and is configured to supply fuel pressure-fed from a fuel tank to the fuel injection valve. The fuel injection valve includes a connection portion and a fuel introducing portion that are inserted into the mounting portion. The fuel introducing portion is provided to protrude from an end surface of the connection portion toward an upstream side in a direction in which fuel flows from the fuel tank toward the fuel injection valve. An outer diameter of the fuel introducing portion is smaller than an outer diameter of the connection portion. The sealing structure is a structure configured to seal a gap between an inner circumferential surface of the mounting portion and the fuel injection valve. The sealing structure includes: an O-ring; and a back-up ring. The fuel introducing portion is inserted into the O-ring. The fuel introducing portion is inserted into the back-up ring, and the back-up ring is disposed between the O-ring and the end surface of the connection portion. The back-up ring has a cylindrical shape. An outer diameter of the back-up ring is smaller than an inner diameter of the mounting portion. The back-up ring includes a pressure-receiving surface that is a surface located closer to the O-ring, and a seating surface that is a surface located closer to the end surface of the connection portion. An inner diameter of the back-up ring is increased from the pressure-receiving surface toward the seating surface, and is greater than the outer diameter of the fuel introducing portion at any position on a central axis of the fuel injection valve. In a section of the back-up ring along the central axis of the fuel injection valve, an angle defined between the pressure-receiving surface of the back-up ring and an inner circumferential surface of the back-up ring is smaller than an angle defined between the pressure-receiving surface of the back-up ring and an outer circumferential surface of the fuel introducing portion. In a direction orthogonal to the central axis, a length from an outer circumferential surface of the back-up ring in the seating surface to the inner circumferential surface of the back-up ring in the seating surface is shorter than a length from the outer circumferential surface of the fuel introducing portion in the end surface to an inner circumferential surface of the mounting portion.

According to the above configuration, on the end surface of the connection portion, the length of the seating surface of the back-up ring is shorter than the length between the inner circumferential surface of the mounting portion and the outer circumferential surface of the fuel introducing portion. This configuration facilitates the surface contact between the seating surface of the back-up ring and the end surface of the connection portion in a state of applying no fuel pressure to the O-ring and the back-up ring. That is, the back-up ring can be seated to the fuel injection valve. Since this seating facilitates coaxial arrangement of the back-up ring relative to the fuel injection valve, it is possible to suppress generation of a gap that allows the O-ring to enter between the back-up ring and the fuel injection valve, to thus suppress deterioration of the sealing performance.

In addition, according to the above configuration, in the state of applying no fuel pressure to the O-ring and the back-up ring, a contact between the outer circumferential surface of the back-up ring and the inner circumferential surface of the mounting portion as well as a contact between the inner circumferential surface of the back-up ring and the outer circumferential surface of the fuel introducing portion of the fuel injection valve are unlikely to occur. Accordingly, in the state of applying no fuel pressure to the O-ring and the back-up ring, a surface contact between the seating surface of the back-up ring and the end surface of the connection portion becomes unlikely to be hindered.

In the above configuration, when the fuel pressure is applied to the back-up ring, the back-up ring becomes deformed, and thereby the outer circumferential surface of the back-up ring comes into contact with the inner circumferential surface of the mounting portion. Similarly, the back-up ring becomes deformed, and thus the inner circumferential surface of the back-up ring comes into contact with the outer circumferential surface of the fuel introducing portion of the fuel injection valve. Accordingly, it is possible to fill the gap between the back-up ring and the inner circumferential surface of the mounting portion and the gap between the back-up ring and the outer circumferential surface of the fuel introducing portion.

The above configuration has such a relationship that the angle defined between the pressure-receiving surface and the inner circumferential surface of the back-up ring is smaller than the angle defined between the pressure-receiving surface of the back-up ring and the outer circumferential surface of the fuel introducing portion. Hence, when the fuel pressure is applied to the back-up ring, the edge portion located at the inner circumferential edge of the pressure-receiving surface is likely to be deformed toward the seating surface side. Accordingly, the gap between the back-up ring and the outer circumferential surface of the fuel introducing portion is likely to be easily filled.

A second aspect of the present disclosure relates to a sealing structure. The sealing structure is applied to a fuel supply apparatus of an internal combustion engine. The fuel supply apparatus includes a delivery pipe, and a fuel injection valve. The delivery pipe includes a mounting portion into which the fuel injection valve is inserted, and is configured to supply fuel pressure-fed from a fuel tank to the fuel injection valve. The fuel injection valve includes a connection portion and a fuel introducing portion that are inserted into the mounting portion. The fuel introducing portion is provided to protrude from an end surface of the connection portion toward an upstream side in a direction in which fuel flows from the fuel tank toward the fuel injection valve. An outer diameter of the fuel introducing portion is smaller than an outer diameter of the connection portion. The sealing structure is a structure configured to seal a gap between an inner circumferential surface of the mounting portion and the fuel injection valve. The sealing structure includes an O-ring, and a back-up ring. The fuel introducing portion is inserted into the O-ring. The fuel introducing portion is inserted into the back-up ring, and the back-up ring is disposed between the O-ring and the end surface of the connection portion. The back-up ring has a cylindrical shape. The back-up ring includes a pressure-receiving surface that is a surface located closer to the O-ring, and a seating surface that is a surface located closer to the end surface of the connection portion. An outer diameter of the back-up ring is decreased from the pressure-receiving surface toward the seating surface. The outer diameter of the back-up ring in the pressure-receiving surface is smaller than an inner diameter of the mounting portion. An inner diameter of the back-up ring is greater than the outer diameter of the fuel introducing portion at any position on a central axis of the fuel injection valve. In a direction orthogonal to the central axis, a length from an outer circumferential surface of the back-up ring in the seating surface to an inner circumferential surface of the back-up ring in the seating surface is shorter than a length from an outer circumferential surface of the fuel introducing portion in the end surface to an inner circumferential surface of the mounting portion.

According to the above configuration, on the end surface of the connection portion, the length of the seating surface of the back-up ring is shorter than the length between the inner circumferential surface of the mounting portion and the outer circumferential surface of the fuel introducing portion. This configuration facilitates the surface contact between the seating surface of the back-up ring and the end surface of the connection portion in a state of applying no fuel pressure to the O-ring and the back-up ring. That is, the back-up ring can be seated to the fuel injection valve. Since this seating facilitates coaxial arrangement of the back-up ring relative to the fuel injection valve, it is possible to suppress generation of a gap that allows the O-ring to enter between the back-up ring and the fuel injection valve, to thus suppress deterioration of the sealing performance.

In addition, according to the above configuration, in the state of applying no fuel pressure to the O-ring and the back-up ring, a contact between the outer circumferential surface of the back-up ring and the inner circumferential surface of the mounting portion as well as a contact between the inner circumferential surface of the back-up ring and the outer circumferential surface of the fuel introducing portion of the fuel injection valve are unlikely to occur. Accordingly, in the state of applying no fuel pressure to the O-ring and the back-up ring, a surface contact between the seating surface of the back-up ring and the end surface of the connection portion becomes unlikely to be hindered.

In the above configuration, when the fuel pressure is applied to the back-up ring, the back-up ring becomes deformed, and thereby the outer circumferential surface of the back-up ring comes into contact with the inner circumferential surface of the mounting portion. Similarly, the back-up ring becomes deformed, and thus the inner circumferential surface of the back-up ring comes into contact with the outer circumferential surface of the fuel introducing portion of the fuel injection valve. Accordingly, it is possible to fill the gap between the back-up ring and the inner circumferential surface of the mounting portion and the gap between the back-up ring and the outer circumferential surface of the fuel introducing portion.

In the above configuration, the outer diameter of the back-up ring is gradually decreased from the pressure-receiving surface toward the seating surface side. Hence, when the fuel pressure is applied to the back-up ring, the edge portion located at the outer circumferential edge of the pressure-receiving surface becomes easily deformed toward the seating surface side. Accordingly, the gap between the back-up ring and the inner circumferential surface of the mounting portion is likely to be easily filled.

In the sealing structure, the fuel introducing portion may include a tapered portion having a diameter gradually increased from an upstream side of a fuel flow passage toward the end surface of the connection portion. The angle defined between the pressure-receiving surface of the back-up ring and the inner circumferential surface of the back-up ring may be smaller than the angle defined between the pressure-receiving surface and the outer circumferential surface in the tapered portion. Accordingly, it is possible to configure the edge portion located at the inner circumferential edge of the pressure-receiving surface to be easily deformable toward the seating surface side.

In the sealing structure, the outer diameter of the back-up ring may be gradually decreased from the pressure-receiving surface toward the seating surface. The outer diameter of the back-up ring in the pressure-receiving surface may be smaller than the inner diameter of the mounting portion.

According to the above configuration, when the fuel pressure is applied to the back-up ring, the edge portion located at the inner circumferential edge of the pressure-receiving surface as well as the edge portion located at the outer circumferential edge of the pressure-receiving surface are easily deformable toward the seating surface side. Accordingly, the gap between the back-up ring and the outer circumferential surface of the fuel introducing portion as well as the gap between the back-up ring and the inner circumferential surface of the mounting portion are likely to be easily filled.

In the sealing structure, the back-up ring may include an inner-circumferential stepped portion at a portion of the inner circumferential surface, the portion being located closer to the seating surface than the pressure-receiving surface is, the inner-circumferential stepped portion being recessed toward the outer circumferential surface of the back-up ring. According to the above configuration, the inner-circumferential stepped portion is formed to the inner circumferential surface of the back-up ring, and thus rigidity of the back-up ring becomes smaller on the seating surface side than on the edge portion located at the inner circumferential edge of the pressure-receiving surface. Accordingly, the edge portion becomes easily deformable. That is, the gap between the back-up ring and the outer circumferential surface of the fuel introducing portion is likely to be easily filled.

In the sealing structure, the back-up ring may include an outer-circumferential stepped portion at a portion of the outer circumferential surface, the portion being located closer to the seating surface than the pressure-receiving surface is, the outer-circumferential stepped portion being recessed toward the inner circumferential surface of the back-up ring. According to the above configuration, the outer-circumferential stepped portion is formed to the outer circumferential surface of the back-up ring, and thus rigidity of the back-up ring becomes smaller on the seating surface than on the edge portion located at the outer circumferential edge of the pressure-receiving surface. Accordingly, the edge portion becomes easily deformable. That is, the gap between the back-up ring and the inner circumferential surface of the mounting portion is likely to be easily filled.

In the sealing structure, the back-up ring may include an inner-circumferential stepped portion at a portion of the inner circumferential surface, the portion being located closer to the seating surface than the pressure-receiving surface is, the inner-circumferential stepped portion being recessed toward the outer circumferential surface of the back-up ring; and the back-up ring may also include an outer-circumferential stepped portion at a portion of the outer circumferential surface, the portion being located closer to the seating surface than the pressure-receiving surface is, the outer-circumferential stepped portion being recessed toward the inner circumferential surface of the back-up ring.

According to the above configuration, rigidity of the back-up ring becomes smaller on the seating surface than on the edge portion located at the inner circumferential edge of the pressure-receiving surface. In addition, rigidity becomes smaller on the seating surface than on the edge portion located at the outer circumferential edge of the pressure-receiving surface. Accordingly, the edge portion located at the inner circumferential edge of the pressure-receiving surface as well as the edge portion located at the outer circumferential edge of the pressure-receiving surface become easily deformable. That is, the gap between the back-up ring and the outer circumferential surface of the fuel introducing portion as well as the gap between the back-up ring and the inner circumferential surface of the mounting portion are likely to be easily filled.

In the sealing structure, the back-up ring may include a slit extending from the pressure-receiving surface through the seating surface, and the slit may be inclined relative to the central axis.

According to the above configuration, when fuel pressure is applied to the back-up ring, the back-up ring can be deformed in the direction in which one end and the other end on both sides of the slit of the back-up ring separate from each other. That is, the back-up ring can be deformed in the direction in which its diameter is increased. Accordingly, the gap between the outer circumferential surface of the back-up ring and the inner circumferential surface of the mounting portion is likely to be easily filled.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a sealing structure 10 that is one embodiment of a sealing structure will be described with reference to FIG. 1 to FIG. 3.

Figure 1:
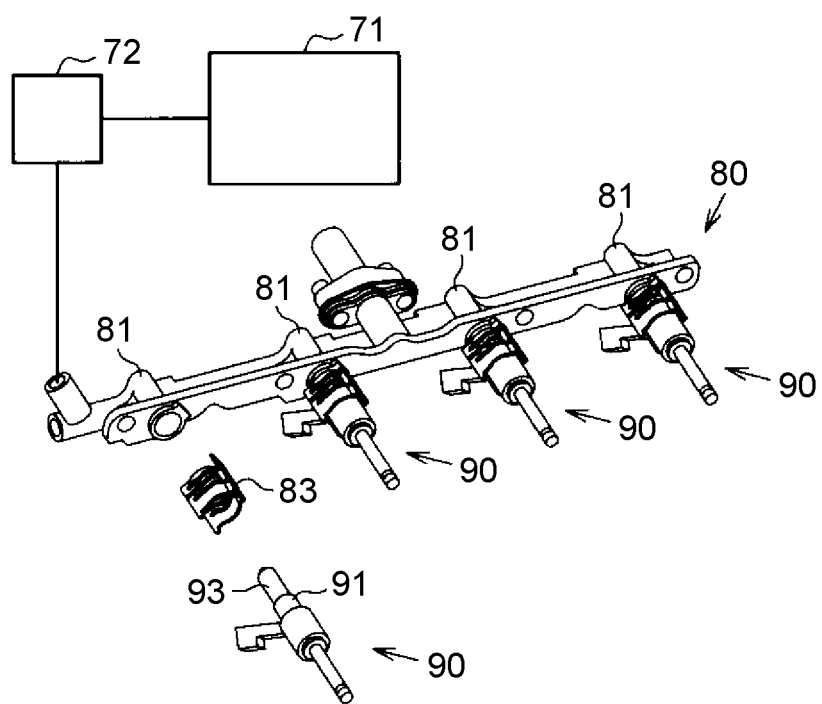
FIG. 1 is a schematic view of a fuel injection supply apparatus to which a sealing structure is applied.

FIG. 1 shows a fuel injection supply apparatus to which the sealing structure 10 is applied. The fuel injection supply apparatus includes: a fuel tank 71; a delivery pipe 80 as a fuel delivery pipe; a high-pressure fuel pump 72 for pressure-feeding fuel pumped up from the fuel tank 71 to the delivery pipe 80; and fuel injection valves 90 that inject the fuel supplied from the delivery pipe 80. The fuel injection supply apparatus is provided with a fuel flow passage from the fuel tank 71 to the fuel injection valves 90.

Figure 2:
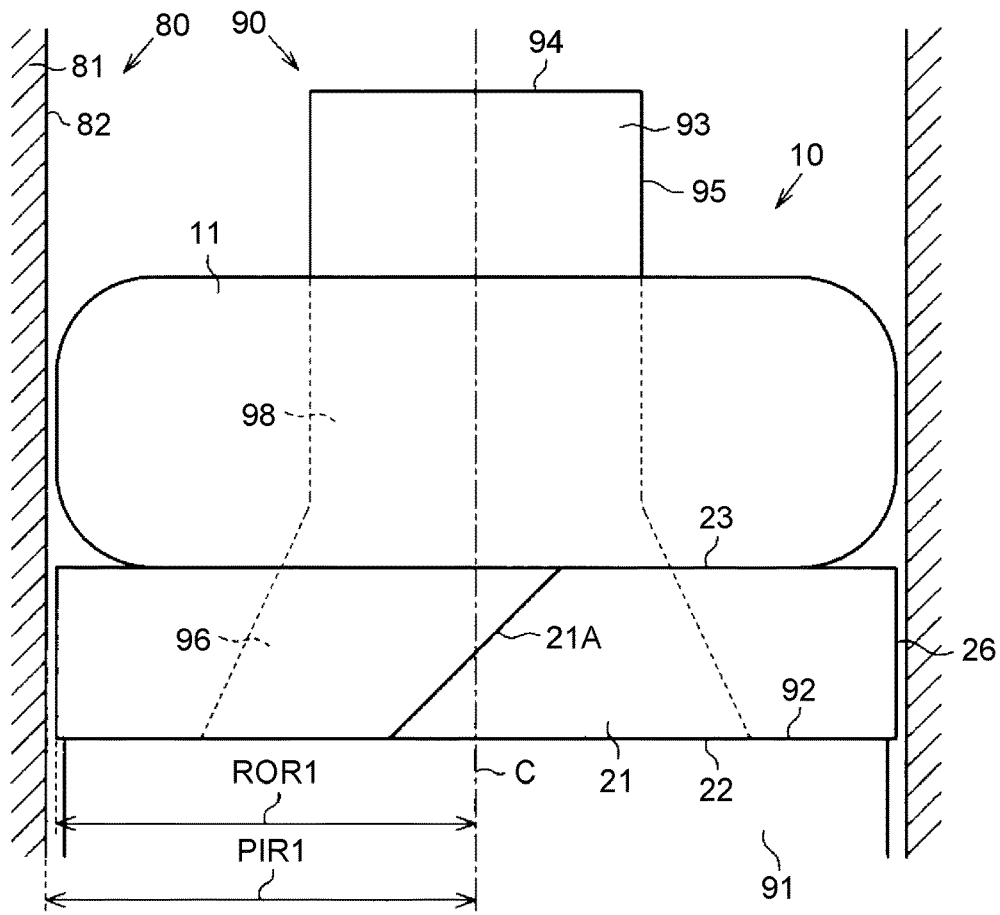
FIG. 2 is a view showing a first embodiment of the sealing structure.

FIG. 2 is a partial sectional view showing a part where the delivery pipe 80 and each fuel injection valve 90 both included in the fuel injection supply apparatus are connected to each other. As shown in FIG. 1 and FIG. 2, the delivery pipe 80 includes cylindrical mounting portions 81 into which the fuel injection valves 90 are mounted.

The fuel injection valve 90 is connected to the delivery pipe 80 such that a connection portion 91 of the fuel injection valve 90 that is an end opposite to a fuel injection port of the fuel injection valve 90. The fuel injection valve 90 is coaxially arranged to a mounting portion 81 in such a manner that a central axis of the fuel injection valve 90 coincides with a central axis of the mounting portion 81. In FIG. 2, the central axis of the fuel injection valve 90 is denoted by an axis C. The fuel injection valve 90 inserted in the mounting portion 81 is pressed and fixed from the outside by a holder 83 that squeezes the mounting portion 81 and the fuel injection valve 90 from both sides.

The fuel injection valve 90 includes a fuel introducing portion 93 having a smaller diameter than that of the connection portion 91. The fuel introducing portion 93 is provided to protrude toward the upstream side of the fuel flow passage from an end surface 92 of the connection portion 91. That is, the fuel introducing portion 93 is housed inside the mounting portion 81. The fuel introducing portion 93 includes: a tapered portion 96 protruding from the end surface 92 of the connection portion 91; and a cylindrical portion 98 located more upstream in the fuel flow passage than the tapered portion 96. The tapered portion 96 is formed such that its outer diameter is gradually decreased with distance from the end surface 92. The cylindrical portion 98 is formed such that its outer diameter is constant in the extending direction of the axis C and this outer diameter is the same as an outer diameter of a portion of the tapered portion 96. The portion of the tapered portion 96 is located on the cylindrical portion 98 side. An introducing port 94 that introduces the fuel supplied from the delivery pipe 80 into the fuel injection valve 90 is provided to an end of the fuel introducing portion 93 on the opposite side to the end surface 92 of the connection portion 91, that is, an end of the cylindrical portion 98.

As shown in FIG. 2, the sealing structure 10 includes an O-ring 11 and a back-up ring 21. The O-ring 11 is an annular seal member. Fluororubber or the like may be adopted as the material of the O-ring 11. The fuel introducing portion 93 is inserted in the O-ring 11 such that a central axis of the O-ring 11 coincides with the axis C.

The back-up ring 21 is disposed between the O-ring 11 and the end surface 92 of the connection portion 91. Fluororesin or the like may be adopted as the material of the back-up ring 21. As shown in FIG. 2 and FIG. 3, the back-up ring 21 is formed to have a columnar outer shape, and is formed in a cylindrical shape such that a hole 27, extending through the back-up ring 21 from one bottom surface to the other bottom surface, opens to the both bottom surfaces. The fuel introducing portion 93 is inserted in the hole 27 such that a central axis of the back-up ring 21 coincides with the axis C. In the back-up ring 21 in a columnar shape, a seating surface 22 that is a bottom surface located on the end surface 92 side is in contact with the end surface 92. In the back-up ring 21 in a columnar shape, a pressure-receiving surface 23 that is a bottom surface located on the O-ring 11 side faces the O-ring 11. When fuel pressure is applied from the upstream to the downstream of the fuel flow passage, that is, from the upper side to the lower side in FIG. 2, the O-ring 11 is pressed against the pressure-receiving surface 23 of the back-up ring 21. The back-up ring 21 is pressed against the end surface 92 of the connection portion 91 due to this pressing of the O-ring 11.

FIG. 2 shows an outer radius ROR1 of the back-up ring 21 and an inner radius PIR1 of the mounting portion 81 of the delivery pipe 80. The outer radius ROR1 of the back-up ring 21 is smaller than the inner radius PIR1 of the mounting portion 81. This means that the outer diameter of the back-up ring 21 is formed to be smaller than the inner diameter of the mounting portion 81. Hence, when the central axis of the back-up ring 21 coincides with the axis C, as shown in FIG. 2, an outer circumferential surface 26 of the back-up ring 21 is out of contact with a mounting-portion inner surface 82 that is an inner circumferential surface of the mounting portion 81. The back-up ring 21 is formed such that an outer diameter of the seating surface 22 is equal to an outer diameter of the pressure-receiving surface 23, and the outer diameter is constant from the seating surface 22 through the pressure-receiving surface 23 in the extending direction of the axis C.

The back-up ring 21 includes a slit 21A extending from the pressure-receiving surface 23 through the seating surface 22. Hence, the back-up ring 21 is partially disconnected in the circumferential direction. The slit 21A is formed to be inclined relative to the central axis of the back-up ring 21. In other words, the slit 21A is a so-called bias cut. Because of the inclination of the slit 21A, when the seating surface 22 or the pressure-receiving surface 23 is pressed, the slit 21A can be deformed such that one end and the other end with the slit 21A interposed therebetween separate from each other. When the one end and the other end with the slit 21A interposed therebetween separate from each other, the diameter of the back-up ring 21 becomes increased.

Figure 3:
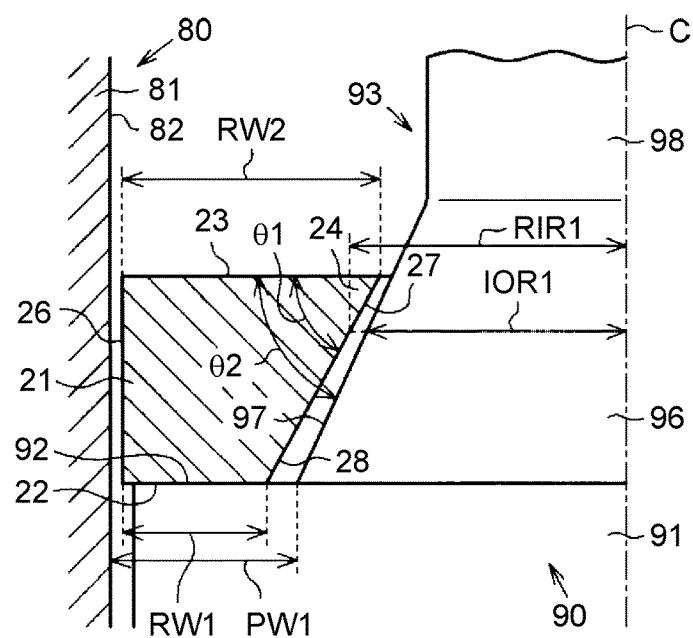
FIG. 3 is a sectional view showing a back-up ring included in the sealing structure according to the same embodiment.

With reference to FIG. 3, the shape of the back-up ring 21 will be described in detail. FIG. 3 shows a sectional shape of the back-up ring 21 along the axis C. Because the outer diameter of the back-up ring 21 is constant in the extending direction of the axis C, in the sectional shape along the axis C as shown in FIG. 3, the outer circumferential surface 26 is parallel to the mounting-portion inner surface 82.

The hole 27 of the back-up ring 21 has a diameter gradually increased from the pressure-receiving surface 23 toward the seating surface 22. That is, an inner diameter of the back-up ring 21 is increased from the pressure-receiving surface 23 toward the seating surface 22. Therefore, in the sectional shape along the axis C as shown in FIG. 3, the inner circumferential surface 28 of the back-up ring 21 is inclined relative to the axis C in such a manner as to be closer to the outer circumferential surface 26 as the inner circumferential surface 28 comes closer to the seating surface 22 from the pressure-receiving surface 23.

Since the diameter of the hole 27 is thus increased, in the back-up ring 21, a portion that is located at an inner circumferential edge of the pressure-receiving surface 23 and that is located on the pressure-receiving surface 23 side in the inner circumferential surface 28 is formed at a sharp angle in sectional view. When the portion at the sharp angle in sectional view is defined as an inner edge portion 24, an angle θ1 of an edge portion defined between the pressure-receiving surface 23 and the inner circumferential surface 28 in this inner edge portion 24 is set to be smaller than an angle θ2 of a gap defined between the pressure-receiving surface 23 and a tapered outer surface 97 of the tapered portion 96.

FIG. 3 shows an outer radius IOR1 of the tapered portion 96 and an inner radius RIR1 of the back-up ring 21 that are located at a certain position between the pressure-receiving surface 23 and the seating surface 22. The inner radius RIR1 of the back-up ring 21 is larger than the outer radius IOR1 of the tapered portion 96. That is, the inner diameter of the back-up ring 21 is formed to be larger than the outer diameter of the tapered portion 96. In other words, the diameter of the hole 27 is formed to be larger than the outer diameter of the tapered portion 96. The dimensional relationship between these diameters is satisfied on the pressure-receiving surface 23 and also on the seating surface 22. This means that the back-up ring 21 is configured such that the diameter of the hole 27 is larger than the outer diameter of the tapered portion 96 at any position on the axis C.

In a direction orthogonal to the axis C, a length from the outer circumferential surface 26 of the seating surface 22 to the inner circumferential surface 28 of the seating surface 22 is defined as a dimension RW1. In the direction orthogonal to the axis C, a length from the outer circumferential surface 26 of the pressure-receiving surface 23 to the inner circumferential surface 28 of the pressure-receiving surface 23 is defined as a dimension RW2. The back-up ring 21 is formed such that the dimension RW1 is shorter than the dimension RW2.

In addition, a length from an end of the tapered portion 96 of the fuel introducing portion 93, the end on the end surface 92 side of the connection portion 91, to the mounting-portion inner surface 82 that is the inner circumferential surface of the mounting portion 81 is defined as a gap PW1. That is, the gap PW1 is a length from the tapered outer surface 97 of the end surface 92 to the mounting-portion inner surface 82 in the direction orthogonal to the axis C. The back-up ring 21 is formed such that the dimension RW1 is shorter than the gap PW1, and the seating surface 22 of the back-up ring 21 is in contact with the end surface 92.

As an example of the shape of the back-up ring 21, it is preferable that a difference between the inner radius PIR1 of the mounting portions 81 and the outer radius ROR1 of the back-up ring 21 and a difference between the inner radius RIR1 of the back-up ring 21 and the outer radius IOR1 of the tapered portion 96 are each set to be approximately $1/200$ to $1/20$ of the dimension RW2. The edge angle $\theta 1$ is preferably smaller than the gap angle $\eta 2$ by approximately 0.1° to 2.0°.

Next, a mounting method for connecting the fuel injection valve 90 to the delivery pipe 80 will be described. First, the fuel introducing portion 93 is inserted into the hole 27 of the back-up ring 21, and the back-up ring 21 is fitted to the fuel injection valve 90. Subsequently, the seating surface 22 of the back-up ring 21 is brought to contact with the end surface 92 of the connection portion 91 so as to seat the back-up ring 21 to the fuel injection valve 90. Then, the fuel introducing portion 93 is inserted into the O-ring 11, and the O-ring 11 is fitted to the fuel injection valve 90 from above the back-up ring 21. The connection portion 91 is inserted into the mounting portion 81 so as to mount the fuel injection valve 90 to the delivery pipe 80.

Operation and effects of the present embodiment will be described. In the sealing structure 10, on the end surface 92 of the connection portion 91, a length of the seating surface 22 of the back-up ring 21 is shorter than a length between the mounting-portion inner surface 82 of the mounting portion 81 and the tapered outer surface 97 of the tapered portion 96. Hence, in a state in which no fuel pressure is applied to the O-ring 11 and the back-up ring 21, it is facilitated to bring the seating surface 22 of the back-up ring 21 to come into surface-contact with the end surface 92 of the connection portion 91. That is, the back-up ring 21 can be seated to the fuel injection valve 90. According to the sealing structure 10, the seating of the back-up ring 21 to the fuel injection valve 90 facilitates arrangement of the central axis of the back-up ring 21 in parallel to the central axis of the fuel injection valve 90.

In addition, the outer diameter of the back-up ring 21 is set to be smaller than an inner diameter of the mounting portion 81. Furthermore, the inner diameter of the back-up ring 21 is set to be larger than the outer diameter of the tapered portion 96. Hence, in the state in which no fuel pressure is applied to the O-ring 11 and the back-up ring 21, a contact between the outer circumferential surface 26 of the back-up ring 21 and the mounting-portion inner surface 82 of the mounting portions 81 as well as a contact between the inner circumferential surface 28 of the back-up ring 21 and the tapered outer surface 97 of the tapered portion 96 in the fuel introducing portion 93 of the fuel injection valve 90 are unlikely to occur. Accordingly, in the state in which no fuel pressure is applied to the O-ring 11 and the back-up ring 21, the surface contact between the seating surface 22 of the back-up ring 21 and the end surface 92 of the connection portion 91 is unlikely to be hindered.

In the sealing structure 10, when fuel pressure is applied to the back-up ring 21, the back-up ring 21 is deformed, and the outer circumferential surface 26 of the back-up ring 21 thereby comes into contact with the mounting-portion inner surface 82. Similarly, the back-up ring 21 is deformed, and the inner circumferential surface 28 of the back-up ring 21 thereby comes into contact with the tapered outer surface 97 of the tapered portion 96. These contacts allow the gap between the back-up ring 21 and the mounting-portion inner surface 82 as well as the gap between the back-up ring 21 and the tapered outer surface 97 of the tapered portion 96 to be filled.

As aforementioned, according to the sealing structure 10, when the fuel pressure is applied to the O-ring 11 and the back-up ring 21, the back-up ring 21 seated to the fuel injection valve 90 becomes deformed, to thereby suppress generation of the gap that allows the O-ring 11 to enter between the back-up ring 21 and the fuel injection valve 90. Thus, it is possible to suppress deterioration of the sealing performance.

If the back-up ring is mounted with its central axis inclined relative to the axis C, at least a part of the seating surface might be out of contact with the fuel injection valve. Although the central axis of the back-up ring is arranged in parallel to the axis C, in the case in which the back-up ring is partially disconnected in the circumferential direction of the back-up ring, as in case of providing the slit 21A, one end or the other end of the back-up ring might not be in contact with the fuel injection valve. When the fuel pressure is increased in the state in which at least part of the seating surface is out of contact with the fuel injection valve, the fuel pressure acting on the fuel injection valve 90 might become ununiform in the circumferential direction. In this case, there is a possibility that the central axis of the fuel injection valve 90 deviates from the central axis of the mounting portion 81, or the gap between the fuel injection valve 90 and the delivery pipe 80 cannot be sealed. In contrast, according to the sealing structure 10, since the seating surface 22 of the back-up ring 21 can be easily brought to contact with the end surface 92 of the connection portion 91, it is possible to suppress positional deviation of the central axis of the fuel injection valve 90 from the central axis of the mounting portion 81. Deterioration of the sealing performance can be suppressed, as well.

Furthermore, the sealing structure 10 has such a relationship that the edge angle $\theta 1$ defined between the pressure-receiving surface 23 and the inner circumferential surface 28 of the back-up ring 21 is smaller than the gap angle $\theta 2$ defined between the pressure-receiving surface 23 of the back-up ring 21 and the tapered outer surface 97 of the tapered portion 96. Hence, when the fuel pressure is applied to the back-up ring 21, the inner edge portion 24 can be easily deformed toward the seating surface 22 side. Accordingly, the gap between the back-up ring 21 and the tapered outer surface 97 of the tapered portion 96 is likely to be easily filled.

Since the back-up ring 21 has the slit 21A inclined relative to the axis C, when fuel pressure is applied to the back-up ring 21, the back-up ring 21 can be deformed in the direction where one end and the other end on the both sides of the slit 21A separate from each other. That is, the back-up ring 21 can be deformed in a direction where its diameter is increased. Accordingly, it becomes easier to fill the gap between the outer circumferential surface 26 of the back-up ring 21 and the mounting-portion inner surface 82.

Due to fabrication tolerance, there are slight variations in dimension among respective portions of the back-up ring 21. Consequently, the gap between the back-up ring 21 and the delivery pipe 80 and the gap between the back-up ring 21 and the fuel injection valve 90 vary depending on the dimension of the back-up ring 21 to be mounted. However, the back-up ring 21 is easily deformable when the fuel pressure is applied thereto so as to fill the gap between the back-up ring 21 and the delivery pipe 80 and the gap between the back-up ring 21 and the fuel injection valve 90. Accordingly, even if the dimension of the back-up ring 21 varies due to the fabrication tolerance, the sealing performance is unlikely to be deteriorated.

According to the sealing structure 10, when the fuel injection valve 90 is mounted to the delivery pipe 80, there is an allowance for generating a gap between the back-up ring 21 and the delivery pipe 80 as well as a gap between the back-up ring 21 and the fuel injection valve 90. This allowance can reduce insertion load during mounting of the back-up ring 21.

In the above-described embodiment, the mounting-portion inner surface 82 is one example of the inner circumferential surface of the mounting portion. The axis C is one example of the central axis of the fuel injection valve. The tapered outer surface 97 is one example of the outer circumferential surface of the fuel introducing portion in the tapered portion. The inner circumferential surface 28 is one example of the inner circumferential surface of the back-up ring, and the outer circumferential surface 26 is one example of the outer circumferential surface of the back-up ring.

The edge angle θ1 is one example of the angle defined between the pressure-receiving surface of the back-up ring and the inner circumferential surface of the back-up ring. The gap angle θ2 is one example of the angle defined between the pressure-receiving surface of the back-up ring and the outer circumferential surface of the fuel introducing portion.

The dimension RW1 is one example of the length from the outer circumferential surface of the back-up ring in the seating surface to the inner circumferential surface of the back-up ring in the seating surface. The gap PW1 is one example of the length from the outer circumferential surface of the fuel introducing portion in the end surface of the connection portion to the inner circumferential surface of the mounting portion.

Figure 4:
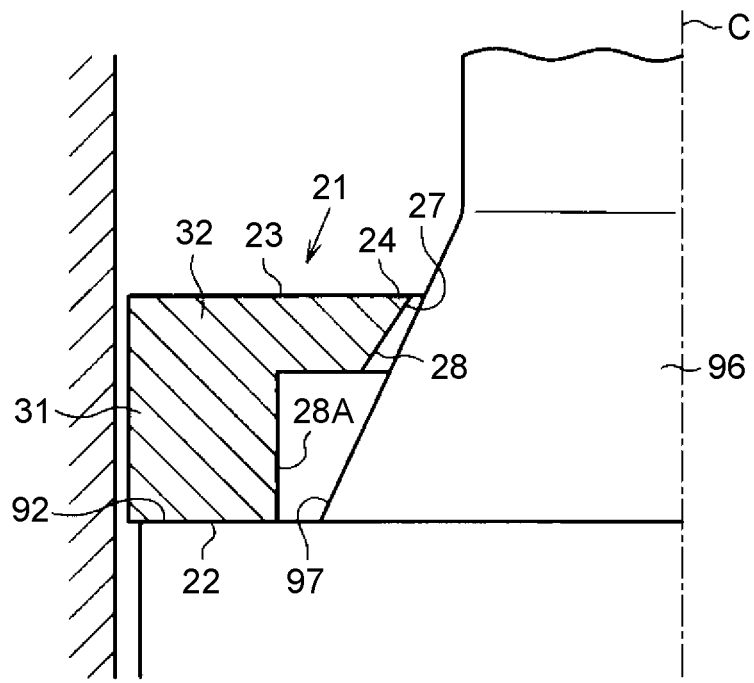
FIG. 4 is a sectional view showing a modification of the sealing structure.

The present embodiment can be implemented by making the following modifications. The present embodiment and the following modifications can be combined and implemented within the scope of causing no technical contradictions. As shown in FIG. 4, the back-up ring 21 may be provided with an inner-circumferential stepped portion 28A on the inner circumferential surface 28. The inner-circumferential stepped portion 28A is formed by recessing a portion of the inner circumferential surface 28, which is located closer to the seating surface 22 than the pressure-receiving surface 23 of the inner circumferential surface 28 is, toward the outer circumferential surface 26 side. It can be described that the back-up ring 21 having the inner-circumferential stepped portion 28A includes: an annular portion 31 that has the seating surface 22 in contact with the end surface 92 and is constant in outer diameter and inner diameter in the extending direction of the axis C; and a variable diameter portion 32 that has the pressure-receiving surface 23 and is formed with the hole 27 having a diameter gradually increased from the pressure-receiving surface 23 toward the seating surface 22.

According to the back-up ring 21 having the inner-circumferential stepped portion 28A, since a portion of the back-ring, which is closer to the seating surface 22 than the inner edge portion 24 at the inner circumferential edge of the pressure-receiving surface 23 is, is recessed with respect to the inner edge portion 24, rigidity on the seating surface 22 side can be smaller than rigidity on the inner edge portion 24 side. Thus, the inner edge portion 24 can be easily deformed. That is, it becomes easier to fill the gap between the back-up ring 21 and the tapered outer surface 97 of the tapered portion 96.

A stepped portion may be further provided to the annular portion 31. By providing multiple annular portions having different inner diameters in such a manner that the multiple annular portions are stacked in the direction of extension of the axis C, it is possible to provide a stepped portion with two or more steps to the back-up ring 21. In this case, one of the multiple annular portions that has the greatest inner diameter may be located at a position on the seating surface 22 side or at a position on the pressure-receiving surface 23 side. The annular portion having the greatest inner diameter may be interposed between the other annular portions.

Second Embodiment

Figure 5:
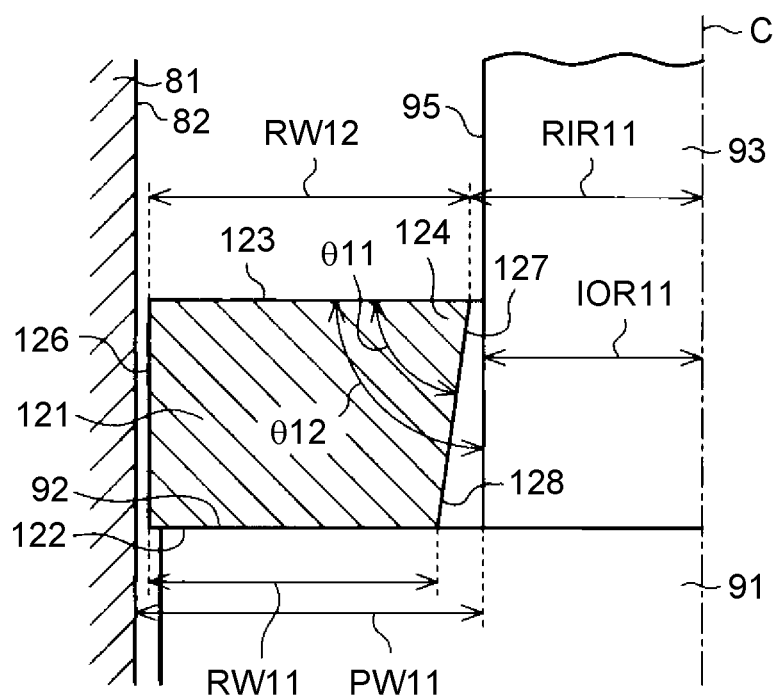
FIG. 5 is a sectional view showing a second embodiment of the sealing structure.

With reference to FIG. 5, the second embodiment will be described. The fuel injection valve 90 of the second embodiment is different in shape of the fuel introducing portion 93 from that of the first embodiment. The same configurations as those of the first embodiment are denoted by the same reference numerals as those of the first embodiment, and description thereof is appropriately omitted.

As shown in FIG. 5, the fuel injection valve 90 includes the fuel introducing portion 93 protruding from the end surface 92 of the connection portion 91. The fuel introducing portion 93 is formed in a cylindrical shape having an outer diameter constant in the extending direction of the axis C.

A back-up ring 121 is formed to have a columnar-shaped external appearance, and formed in a cylindrical shape such that a hole 127 extending through the back-up ring 121 from a seating surface 122 to a pressure-receiving surface 123 opens to the center of the bottom surface. The back-up ring 121 has an outer diameter constant from the seating surface 122 through the pressure-receiving surface 123 in the extending direction of the axis C. The outer diameter of the back-up ring 121 is formed to be smaller than the inner diameter of the mounting portion 81 of the delivery pipe 80.

Since the outer diameter of the back-up ring 121 is constant in the extending direction of the axis C, an outer circumferential surface 126 and the mounting-portion inner surface 82 are parallel to each other in the sectional shape along the axis C, as shown in FIG. 5.

The hole 127 of the back-up ring 121 has a diameter gradually increased from the pressure-receiving surface 123 toward the seating surface 122. That is, an inner diameter of the back-up ring 121 is gradually increased from the pressure-receiving surface 123 toward the seating surface 122. Hence, in the sectional shape along the axis C as shown in FIG. 5, an inner circumferential surface 128 of the back-up ring 121 is inclined relative to the axis C in such a manner as to be closer to the outer circumferential surface 126 as the inner circumferential surface 128 comes closer to the seating surface 122 from the pressure-receiving surface 123.

Since the diameter of the hole 127 is thus increased, in the back-up ring 121, a portion that is located at an inner circumferential edge of the pressure-receiving surface 123 and that is located on the pressure-receiving surface 123 side in the inner circumferential surface 128 is formed at a sharp angle in sectional view. When the portion at the sharp angle in sectional view is defined as an inner edge portion 124, an edge angle θ11 defined between the pressure-receiving surface 123 and the inner circumferential surface 128 in this inner edge portion 124 is set to be smaller than a gap angle θ12 defined between the pressure-receiving surface 123 and an introducing-portion outer surface 95 that is the outer circumferential surface of the fuel introducing portion 93. Note that the clearance angle θ12 is a right angle.

FIG. 5 shows an outer radius IOR11 of the fuel introducing portion 93 and an inner radius RIR11 of the back-up ring 121 on the pressure-receiving surface 123. The inner radius RIR11 is greater than the outer radius IOR11. That is, the inner diameter of the back-up ring 121 is greater than the outer diameter of the fuel introducing portion 93. In other words, the diameter of the hole 127 is formed to be greater than the outer diameter of the fuel introducing portion 93. Since the diameter of the hole 127 is the smallest on the pressure-receiving surface 123, the diameter of the hole 127 is set to be greater than the outer diameter of the fuel introducing portion 93 at any position on the axis C.

In the direction orthogonal to the axis C, a length from the outer circumferential surface 126 of the seating surface 122 to the inner circumferential surface 128 of the seating surface 122 is defined as a dimension RW11. In the direction orthogonal to the axis C, a length from the outer circumferential surface 126 of the pressure-receiving surface 123 to the inner circumferential surface 128 of the pressure-receiving surface 123 is defined as a dimension RW12. The back-up ring 121 is formed such that the dimension RW11 is shorter than the dimension RW12.

In addition, a length from an end of the fuel introducing portion 93, located on the end surface 92 side of the connection portion 91, to the mounting-portion inner surface 82 that is the inner circumferential surface of the mounting portions 81 is defined as a gap PW11. That is, in the direction orthogonal to the axis C, the gap PW11 is a length on the end surface 92 extending from the introducing-portion outer surface 95 to the mounting-portion inner surface 82. The back-up ring 121 is formed such that the dimension RW11 is shorter than the gap PW11, and the seating surface 122 of the back-up ring 121 is in contact with the end surface 92.

Operation and effects of the present embodiment will be described. Even in the case in which the fuel introducing portion 93 is formed in a cylindrical shape having an outer diameter constant in the extending direction of the axis C, according to the sealing structure including the back-up ring 121 and the O-ring 11, it is possible to exert the same effects as those of the first embodiment.

In the aforementioned embodiment, the end surface 92 is an example of the end surface of the connection portion, and the introducing-portion outer surface 95 is an example of the outer circumferential surface of the fuel introducing portion. The mounting-portion inner surface 82 is an example of the inner circumferential surface of the mounting portion. The axis C is an example of the central axis of the fuel injection valve.

The inner circumferential surface 128 is an example of the inner circumferential surface of the back-up ring. The outer circumferential surface 126 is an example of the outer circumferential surface of the back-up ring.

The edge angle θ11 is an example of the angle defined between the pressure-receiving surface of the back-up ring and the inner circumferential surface of the back-up ring. The gap angle θ12 is an example of the angle defined between the pressure-receiving surface of the back-up ring and the outer circumferential surface of the fuel introducing portion.

The dimension RW11 is an example of the length from the outer circumferential surface of the back-up ring in the seating surface to the first inner circumferential surface of the back-up ring in the seating surface. The gap PW11 is an example of the length from the outer circumferential surface of the fuel introducing portion in the end surface of the connection portion to the inner circumferential surface of the mounting portion.

The present embodiment can be implemented by making the following modifications. The present embodiment and the following modifications can be combined and implemented within the scope of causing no technical contradictions. In the above second embodiment, the inner circumferential surface 128 may be provided with the inner-circumferential stepped portion as described using FIG. 4.

Third Embodiment

The third embodiment will be described with reference to FIG. 6. A back-up ring 221 of the third embodiment is different in shape from the back-up ring 121 of the second embodiment. The same configurations as those of the second embodiment are denoted by the same reference numerals as those of the second embodiment, and description thereof is appropriately omitted.

The back-up ring 221 has an external appearance in a truncated cone shape having an outer diameter gradually decreased from a pressure-receiving surface 223 that is a bottom surface of the truncated cone toward a seating surface 222 that is a top surface of the truncated cone. Hence, in the sectional shape along the axis C as shown in FIG. 6, an outer circumferential surface 226 of the back-up ring 221 is inclined relative to the axis C in such a manner as to be closer to an inner circumferential surface 228 as the outer circumferential surface 226 comes closer to the seating surface 222 from the pressure-receiving surface 223. Since the outer circumferential surface 226 is inclined, in the back-up ring 221, a portion located at an outer circumferential edge of the pressure-receiving surface 223, the portion located on the pressure-receiving surface 223 side in the outer circumferential surface 226, is formed at a sharp angle in sectional view. If the portion at the sharp angle in sectional view is defined as an outer edge portion 225, an angle defined between the pressure-receiving surface 223 and the outer circumferential surface 226 in this outer edge portion 225 is set to be smaller than an angle defined between the pressure-receiving surface 223 and the mounting-portion inner surface 82.

The back-up ring 221 is formed in a cylindrical shape such that a hole 227 extending through the back-up ring 221 from the seating surface 222 to the pressure-receiving surface 223 opens to the center of the back-up ring 221. The hole 227 has a diameter that is constant from the seating surface 222 through the pressure-receiving surface 223 in the extending direction of the axis C. This means that an inner diameter of the back-up ring 221 is constant in the extending direction of the axis C. Hence, in the sectional shape along the axis C, the inner circumferential surface 228 of the back-up ring 221 is parallel to the introducing-portion outer surface 95 of the fuel introducing portion 93.

Figure 6:
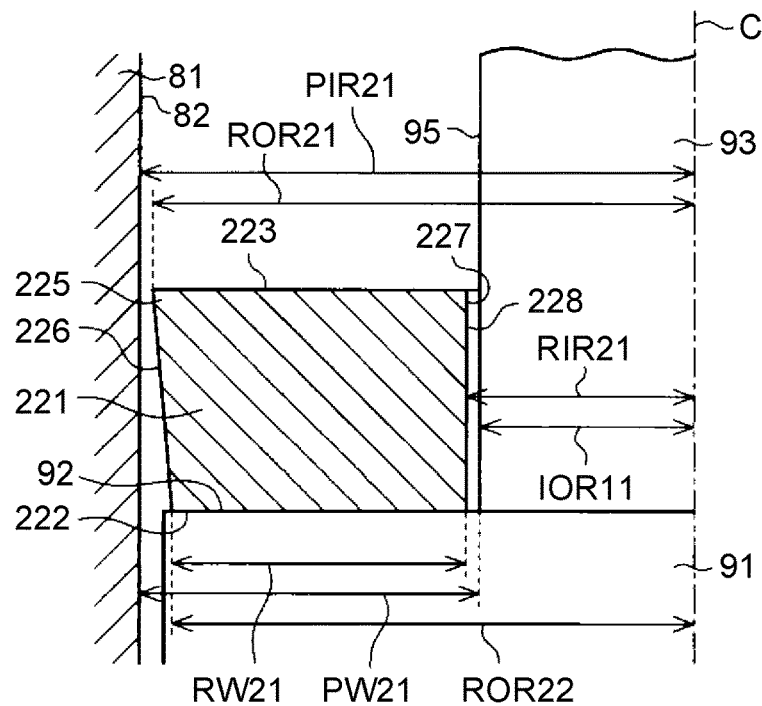
FIG. 6 is a sectional view showing a third embodiment of the sealing structure.

FIG. 6 shows an outer radius ROR21 of the back-up ring 221 on the pressure-receiving surface 223 side, and an outer radius ROR22 of the back-up ring 221 on the seating surface 222 side. FIG. 6 also shows an inner radius PIR21 of the mounting portion 81 of the delivery pipe 80. The outer radius ROR21 on the pressure-receiving surface 223 side is greater than the outer radius ROR22 on the seating surface 222 side. The outer radius ROR21 on the pressure-receiving surface 223 side is smaller than the inner radius PIR21 of the mounting portion 81. That is, the back-up ring 221 is formed to have an outer diameter smaller than the inner diameter of the mounting portion 81.

FIG. 6 shows an inner radius RIR21 of the back-up ring 221 that is a radius of the hole 227, and an outer radius IOR11 of the fuel introducing portion 93. The inner radius RIR21 of the back-up ring 221 is greater than the outer radius IOR11 of the fuel introducing portion 93. This means that the inner diameter of the back-up ring 221 is formed to be greater than the outer diameter of the fuel introducing portion 93. In other words, the diameter of the hole 227 is formed to be greater than the outer diameter of the fuel introducing portion 93.

In the direction orthogonal to the axis C, a length from the outer circumferential surface 226 in the seating surface 222 to the inner circumferential surface 228 in the seating surface 222 is defined as a dimension RW21. In addition, a length from an end of the fuel introducing portion 93, the end being on the end surface 92 side of the connection portion 91, to the mounting-portion inner surface 82 of the mounting portion 81 is defined as a gap PW21. That is, in the direction orthogonal to the axis C, the gap PW21 is a length from the introducing-portion outer surface 95 on the end surface 92 to the mounting-portion inner surface 82. The back-up ring 221 is formed such that the dimension RW21 is shorter than the gap PW21, and the seating surface 222 of the back-up ring 221 is in contact with the end surface 92.

Operation and effects of the present embodiment will be described. According to the third embodiment, on the end surface 92 of the connection portion 91, the length of the seating surface 222 of the back-up ring 221 is shorter than the length between the mounting-portion inner surface 82 and the introducing-portion outer surface 95 of the fuel introducing portion 93. Hence, in the state in which no fuel pressure is applied to the O-ring 11 and the back-up ring 221, it becomes easier to bring the seating surface 222 of the back-up ring 221 to come into surface-contact with the end surface 92 of the connection portion 91. That is, the back-up ring 221 can be seated to the fuel injection valve 90.

In addition, in the state in which no fuel pressure is applied to the O-ring 11 and the back-up ring 221, a contact between the outer circumferential surface 226 of the back-up ring 221 and the mounting-portion inner surface 82 as well as a contact between the inner circumferential surface 228 of the back-up ring 221 and the introducing-portion outer surface 95 of the fuel introducing portion 93 of the fuel injection valve 90 are unlikely to occur. Accordingly, in the state in which no fuel pressure is applied to the O-ring 11 and the back-up ring 221, the surface contact between the seating surface 222 of the back-up ring 221 and the end surface 92 of the connection portion 91 is unlikely to be hindered.

In the back-up ring 221, when fuel pressure is applied to the back-up ring 221, the back-up ring 221 is deformed, and the outer circumferential surface 226 of the back-up ring 221 thereby comes into contact with the mounting-portion inner surface 82. Similarly, the back-up ring 221 is deformed, and the inner circumferential surface 228 of the back-up ring 221 thereby comes into contact with the introducing-portion outer surface 95 of the fuel introducing portion 93 of the fuel injection valve 90. Accordingly, it is possible to fill the gap between the back-up ring 221 and the mounting-portion inner surface 82 as well as the gap between the back-up ring 221 and the introducing-portion outer surface 95 of the fuel introducing portion 93.

It is facilitated by seating the back-up ring 221 to the fuel injection valve 90 to arrange the central axis of the back-up ring 221 in parallel to the central axis of the fuel injection valve 90. Hence, when fuel pressure is applied to the O-ring 11 and the back-up ring 221, the back-up ring 221 seated on the fuel injection valve 90 becomes deformed, to thereby suppress generation of a gap that allows the O-ring 11 to enter between the back-up ring 221 and the fuel injection valve 90, thus suppressing deterioration of the sealing performance.

The outer diameter of the back-up ring 221 is decreased from the pressure-receiving surface 223 toward the seating surface 222, and includes the outer edge portion 225 having a sharp-angled sectional shape. Hence, when the fuel pressure is applied to the back-up ring 221, the outer edge portion 225 are easily deformable toward the seating surface 222 side. Accordingly, the gap between the back-up ring 221 and the mounting-portion inner surface 82 is likely to be easily filled.

In the present embodiment, the introducing-portion outer surface 95 is one example of the outer circumferential surface of the fuel introducing portion. The inner circumferential surface 228 is one example of the inner circumferential surface of the back-up ring. The outer circumferential surface 226 is one example of the outer circumferential surface of the back-up ring.

The dimension RW21 is one example of the length from the outer circumferential surface of the back-up ring in the seating surface to the inner circumferential surface of the back-up ring in the seating surface. The gap PW21 is one example of the length from the circumferential surface of the fuel-introducing portion in the end surface of the connection portion to the inner circumferential surface of the mounting portion.

The present embodiment can be implemented by making the following modifications. The present embodiment and the following modifications can be combined and implemented within the scope of causing no technical contradictions. As with the third embodiment, if the outer diameter of the back-up ring 221 is decreased from the pressure-receiving surface 223 toward the seating surface 222, the degree of decrease in outer diameter can be appropriately changed.

Figure 7:
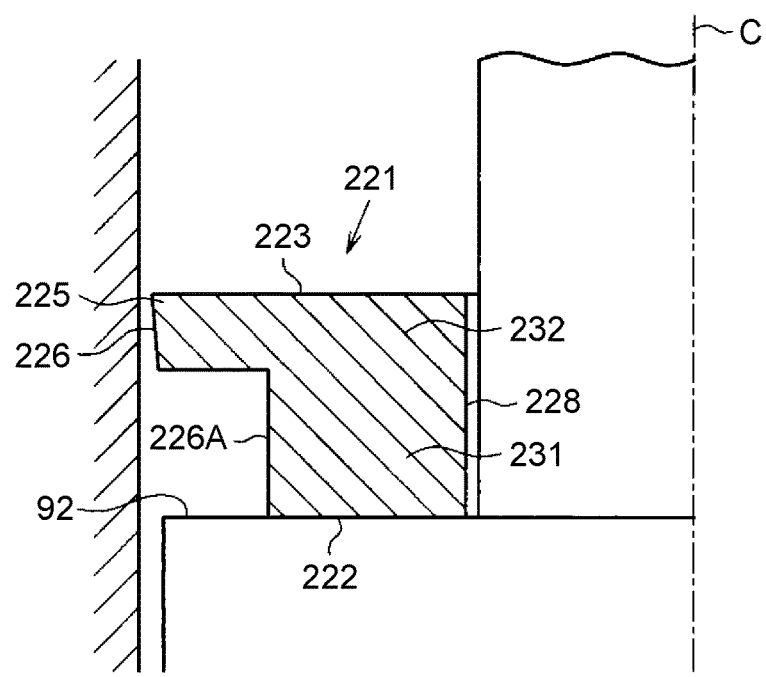
FIG. 7 is a sectional view showing a modification of the sealing structure.

As shown in FIG. 7, an outer-circumferential stepped portion 226A may be provided on the outer circumferential surface 226 of the back-up ring 221. The outer-circumferential stepped portion 226A is formed by recessing a portion of the outer circumferential surface 226, which is located closer to the seating surface 222 than the pressure-receiving surface 223 of the outer circumferential surface 226 is, toward the inner circumferential surface 228 side. It can be described that the back-up ring 221 having the outer-circumferential stepped portion 226A includes: an annular portion 231 that has the seating surface 222 in contact with the end surface 92 and is constant in outer diameter and inner diameter in the extending direction of the axis C; and a variable diameter portion 232 that has the pressure-receiving surface 223 and has an outer diameter gradually decreased from the pressure-receiving surface 223 toward the seating surface 222.

According to the back-up ring 221 having the outer-circumferential stepped portion 226A, rigidity on the seating surface 222 side can be smaller than rigidity on the outer edge portion 225 side located at the outer edge of the pressure-receiving surface 223, and thus the outer edge portion 225 can be easily deformed. That is, it becomes easier to fill the gap between the back-up ring 221 and the mounting-portion inner surface 82. Note that a stepped portion is further provided to the annular portion 231 so as to provide the back-up ring 221 with multiple outer-circumferential stepped portions.

The back-up ring 221 of the third embodiment has an outer diameter gradually decreased from the pressure-receiving surface 223 toward the seating surface 222. In addition to this decrease in outer diameter, there may be adopted a shape having an inner diameter gradually increased from the pressure-receiving surface toward the seating surface.

Figure 8:
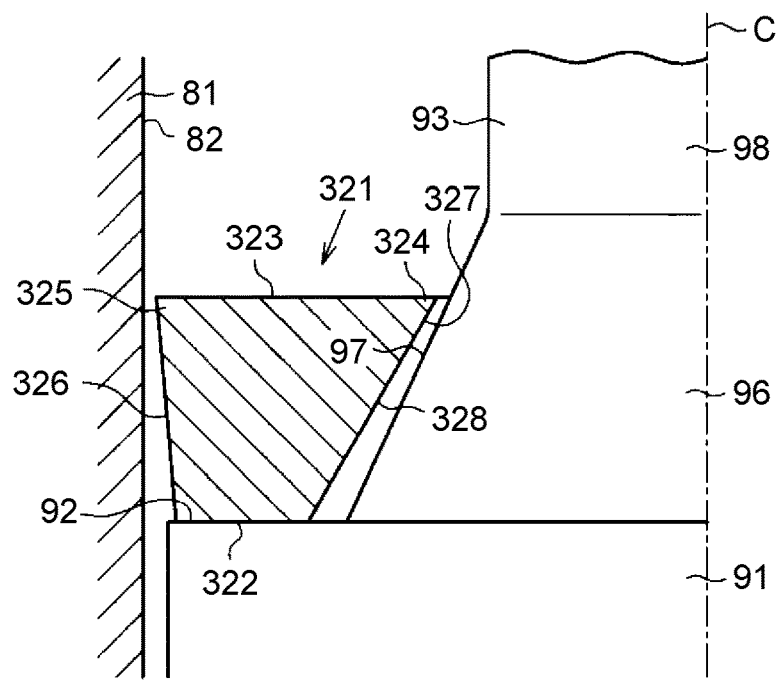
FIG. 8 is a sectional view showing another modification of the sealing structure.

That is, as shown in FIG. 8, in the sectional shape along the axis C, there may be adopted a back-up ring 321 having an outer circumferential surface 326 and an inner circumferential surface 328 that are inclined in such a manner as to be closer to each other on the seating surface 322 side than on the pressure-receiving surface 323. In the back-up ring 321, a diameter of a hole 327 is gradually increased and an inner diameter of the back-up ring 321 is gradually increased from the pressure-receiving surface 323 toward the seating surface 322. FIG. 8 exemplifies that the fuel introducing portion 93 has the tapered portion 96, but the back-up ring 321 can also be applied to the case in which the outer diameter of the fuel introducing portion 93 is constant in the extending direction of the axis C.

According to the back-up ring 321, when fuel pressure is applied to the back-up ring 321, an inner edge portion 324 that is a portion of the pressure-receiving surface 323, located at an inner circumferential edge of the pressure-receiving surface 323 and on the pressure-receiving surface 323 side of an inner circumferential surface 328, is easily deformable toward the seating surface 322 side. In addition, an outer edge portion 325 that is a portion of the pressure-receiving surface 323, located at an outer circumferential edge and on the pressure-receiving surface 323 side of the outer circumferential surface 326, is easily deformable toward the seating surface 322 side. Accordingly, the gap between the back-up ring 321 and the tapered outer surface 97 of the tapered portion 96 as well as the gap between the back-up ring 321 and the mounting-portion inner surface 82 are likely to be easily filled.

In the above embodiment, the inner circumferential surface 328 is one example of the inner circumferential surface of the back-up ring, and the outer circumferential surface 326 is one example of the outer circumferential surface of the back-up ring.

FIG. 8 shows the back-up ring 321 in which not only the outer diameter is decreased but also the diameter of the hole 327 is gradually increased from the pressure-receiving surface 323 toward the seating surface 322. In such a configuration, the degree of increase in diameter of the hole 327, that is, the degree of increase in inner diameter of the back-up ring 321 can be changed.

Figure 9:
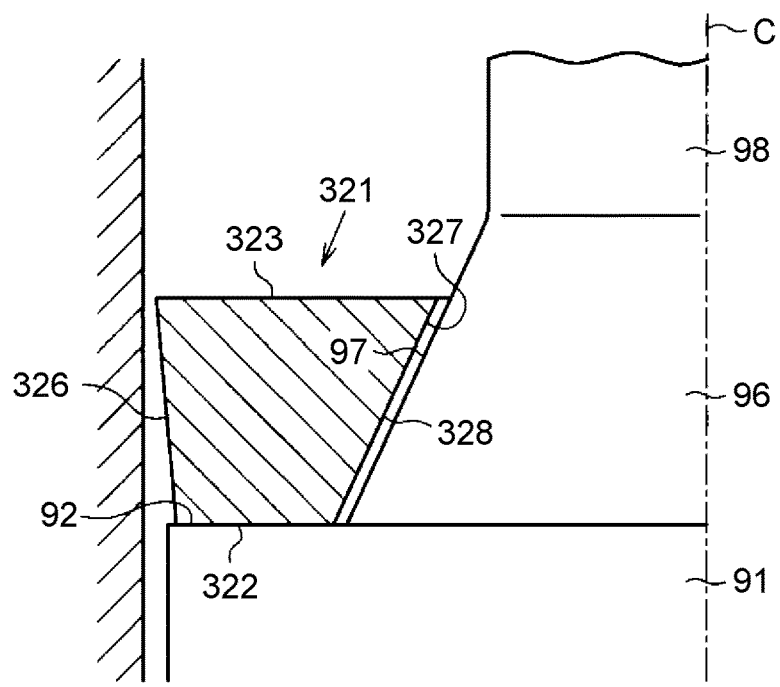
FIG. 9 is a sectional view showing another modification of the sealing structure.

For example, as shown in FIG. 9, in the sectional shape along the axis C, if the outer circumferential surface 326 of the back-up ring 321 is inclined from the pressure-receiving surface 323 toward the seating surface 322, the inner circumferential surface 328 may be parallel to the tapered outer surface 97 of the tapered portion 96.

As shown in FIG. 8, if the outer circumferential surface 326 and the inner circumferential surface 328 are both inclined relative to the axis C, the outer circumferential surface 326 and the inner circumferential surface 328 may be each provided with a stepped portion. An inner-circumferential stepped portion 328A is provided to the inner circumferential surface 328 of the back-up ring 321 shown in FIG. 10. The inner-circumferential stepped portion 328A is formed by recessing a portion of the inner circumferential surface 328, which is located closer to the seating surface 322 than the pressure-receiving surface 323 is, toward the outer circumferential surface 326 side.

Figure 10:
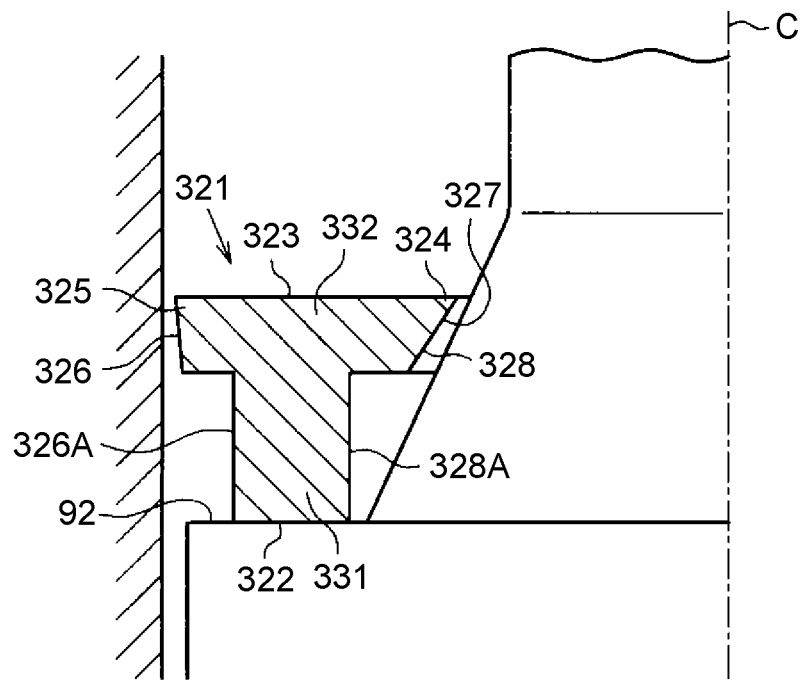
FIG. 10 is a sectional view showing another modification of the sealing structure.

In addition, an outer-circumferential stepped portion 326A is provided to the outer circumferential surface 326 of the back-up ring 321 as shown in FIG. 10. The outer-circumferential stepped portion 326A is formed by recessing a portion of the outer circumferential surface 326, which is located closer to the seating surface 322 than the pressure-receiving surface 323 is, toward the inner circumferential surface 328 side.

It can also be described that the back-up ring 321 including the inner-circumferential stepped portion 328A and the outer-circumferential stepped portion 326A includes an annular portion 331 and a variable diameter portion 332. The annular portion 331 has the seating surface 322 in contact with the end surface 92, and has an outer diameter and an inner diameter that are constant in the extending direction of the axis C. The variable diameter portion 332 has the pressure-receiving surface 323, is formed with the hole 327 having a diameter gradually increased from the pressure-receiving surface 323 toward the seating surface 322, and has an outer diameter gradually decreased from the pressure-receiving surface 323 toward the seating surface 322.

In the back-up ring 321 including the inner-circumferential stepped portion 328A and the outer-circumferential stepped portion 326A, rigidity on the seating surface 322 side is smaller than rigidity on the outer edge portion 325 side. In addition, rigidity on the seating surface 322 side is smaller than rigidity on the outer edge portion 325 side. Accordingly, the inner edge portion 324 and the outer edge portion 325 are easily deformable.

Figure 11:
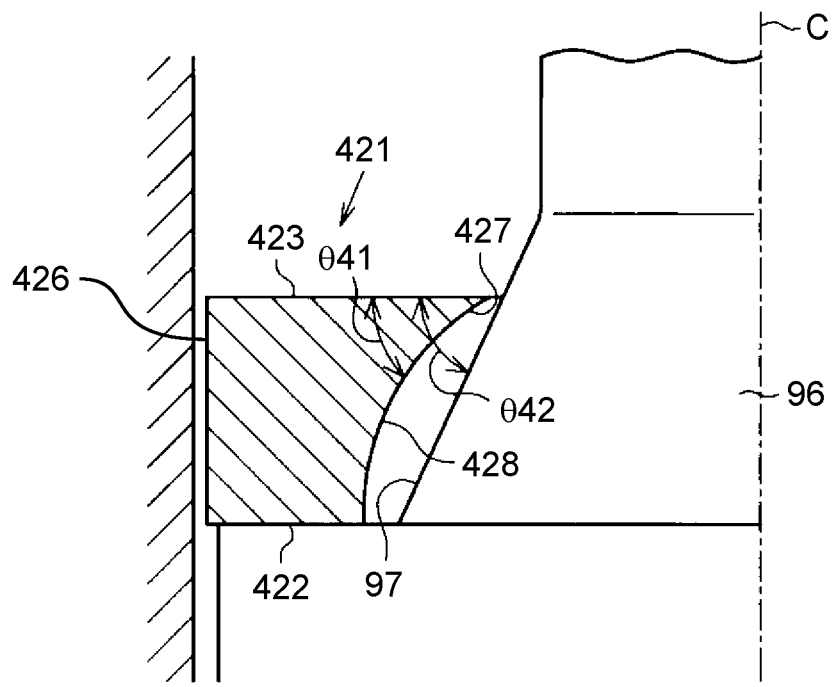
FIG. 11 is a sectional view showing another modification of the sealing structure.

In addition to the above, component elements that are commonly changeable through the above respective embodiments are as follow. In each of the above embodiments, in the sectional shape along the axis C, the inner circumferential surface of the back-up ring includes the linearly extending hole. Alternatively, as shown in FIG. 11, a back-up ring 421 having a curved inner circumferential surface 428 in a sectional shape may be adopted. The back-up ring 421 is formed in a columnar shape including: a seating surface 422; a pressure-receiving surface 423; an inner circumferential surface 428; and an outer circumferential surface 426. The back-up ring 421 includes a hole 427 that satisfies such a relationship in its sectional shape that an edge angle θ41 is smaller than a gap angle θ42. This hole 427 makes the inner circumferential surface 428 of the back-up ring 421 curved.

Similarly, the outer circumferential surface of the back-up ring may be curved in the sectional shape along the axis C. In the sectional shape along the axis C, the stepped portion is not always necessary to be linear, and the stepped portion may be curved in the sectional shape.

In the aforementioned modification, the inner circumferential surface 428 is an example of the inner circumferential surface of the back-up ring. The edge angle θ41 is an example of the angle defined between the pressure-receiving surface of the back-up ring and the inner circumferential surface of the back-up ring. The gap angle θ42 is an example of the angle defined between the pressure-receiving surface of the back-up ring and the outer circumferential surface of the fuel introducing portion.

As with the first embodiment described with reference to FIG. 2 and FIG. 3, when the diameter of the hole 27 of the back-up ring 21 is gradually increased from the pressure-receiving surface 23 toward the seating surface 22, and as far as the edge angle θ1 of the inner edge portion 24 is smaller than the gap angle θ2, the degree of increase in diameter of the hole 27, that is, the degree of increase in inner diameter of the back-up ring 21 can be appropriately changed. Similarly, also in the back-up ring 121 of the second embodiment described with reference to FIG. 5 and the back-up ring 321 described with reference to FIG. 8, the degree of increase in inner diameter can be changed.

The slit 21A formed in the back-up ring 21, as described with reference to FIG. 2, is not an essential configuration. In each of the above embodiments, the thickness of the back-up ring that is a length from the pressure-receiving surface to the seating surface in the extending direction of the axis C can be appropriately changed.

For example, FIG. 3 shows the back-up ring 21 having a thickness where the pressure-receiving surface 23 is located closer to the end surface 92 than the end of the tapered portion 96 on the cylindrical portion 98-side is. By further increasing the thickness of the back-up ring 21, the pressure-receiving surface 23 may be set at a height equal to or higher than the end of the tapered portion 96 on the cylindrical portion 98 side in the extending direction of the axis C.

In the first embodiment, a ratio of the difference between the inner radius PIR1 of the mounting portions 81 and the outer radius ROR1 of the back-up ring 21 to the dimension RM2, and a ratio of the difference between the inner radius RIR1 of the back-up ring 21 and the outer radius IOR1 of the tapered portion 96 to the dimension are each exemplified in term of a ratio relative to the dimension RW2. However, in each of the above embodiments, the respective dimensions of the sealing structure based on the respective shapes of the back-up ring, the fuel injection valve 90, and the mounting portion 81 are not limited to these exemplifications. By seating the back-up ring to the end surface 92 of the fuel injection valve 90 with no fuel pressure applied to the back-up ring, while providing the gap between the outer circumferential surface of the back-up ring and the mounting-portion inner surface 82, and the gap between the inner circumferential surface of the back-up ring and the intro-ducing-portion outer surface 95 (tapered outer surface 97), it is possible to reduce insertion load during the mounting of the back-up ring to the fuel injection valve 90. Furthermore, although the gaps are provided, by decreasing the gaps, the gaps are likely to be easily filled when fuel pressure is applied to the back-up ring, and the back-up ring is thus deformed.

What is claimed is:

1. A sealing structure applied to a fuel supply apparatus of an internal combustion engine, the fuel supply apparatus including a delivery pipe, and a fuel injection valve, the delivery pipe including a mounting portion into which the fuel injection valve is inserted, the delivery pipe being configured to supply fuel pressure-fed from a fuel tank to the fuel injection valve, the fuel injection valve including a connection portion and a fuel introducing portion that are inserted into the mounting portion, the fuel introducing portion being provided to protrude from an end surface of the connection portion toward an upstream side in a direction in which fuel flows from the fuel tank toward the fuel injection valve, an outer diameter of the fuel introducing portion being smaller than an outer diameter of the connection portion, the sealing structure being configured to seal a gap between an inner circumferential surface of the mounting portion and the fuel injection valve, the sealing structure comprising:
an O-ring into which the fuel introducing portion is inserted; and
a back-up ring into which the fuel introducing portion is inserted, the back-up ring being disposed between the O-ring and the end surface of the connection portion, the back-up ring having a cylindrical shape, wherein
an outer diameter of the back-up ring is smaller than an inner diameter of the mounting portion,
the back-up ring includes a pressure-receiving surface that is a surface located closer to the O-ring, and a seating surface that is a surface located closer to the end surface of the connection portion,
an inner diameter of the back-up ring is gradually increased from the pressure-receiving surface toward the seating surface, and is greater than the outer diameter of the fuel introducing portion along all positions on a central axis of the fuel injection valve such that a gap between the back-up ring and the fuel injection valve is generated so that the entire back-up ring is spaced from the fuel injection valve,
in a section of the back-up ring along the central axis of the fuel injection valve, an angle defined between the pressure-receiving surface of the back-up ring and an inner circumferential surface of the back-up ring is smaller than an angle defined between the pressure-receiving surface of the back-up ring and an outer circumferential surface of the fuel introducing portion, and
in a direction orthogonal to the central axis, a length from an outer circumferential surface of the back-up ring in the seating surface to the inner circumferential surface of the back-up ring in the seating surface is shorter than a length from the outer circumferential surface of the fuel introducing portion in the end surface to an inner circumferential surface of the mounting portion.

2. A sealing structure applied to a fuel supply apparatus of an internal combustion engine, the fuel supply apparatus including: a delivery pipe; and a fuel injection valve, the delivery pipe including a mounting portion into which the fuel injection valve is inserted, the delivery pipe being configured to supply fuel pressure-fed from a fuel tank to the fuel injection valve, the fuel injection valve including a connection portion and a fuel introducing portion that are inserted into the mounting portion, the fuel Introducing portion being provided to protrude from an end surface of the connection portion toward an upstream side in a direction in which fuel flows from the fuel tank toward the fuel injection valve, an outer diameter of the fuel introducing portion being smaller than an outer diameter of the connection portion, the sealing structure being configured to seal a gap between an inner circumferential surface of the mounting portion and the fuel injection valve, the sealing structure comprising:
an O-ring into which the fuel introducing portion is inserted; and
a back-up ring into which the fuel introducing portion is inserted, the back-up ring being disposed between the O-ring and the end surface of the connection portion, the back-up ring having a cylindrical shape, wherein the back-up ring includes a pressure-receiving surface that is a surface located closer to the O-ring, and a seating surface that is a surface located closer to the end surface of the connection portion, an outer diameter of the back-up ring is gradually decreased from the pressure-receiving surface toward the seating surface, the outer diameter of the back-up ring in the pressure-receiving surface is smaller than an inner diameter of the mounting portion, an inner diameter of the back-up ring is greater than the outer diameter of the fuel introducing portion along all positions on a central axis of the fuel injection valve such that a gap between the back-up ring and the fuel injection valve is generated so that the entire back-up ring is spaced from the fuel injection valve, and in a direction orthogonal to the central axis, a length from an outer circumferential surface of the back-up ring in the seating surface to an inner circumferential surface of the back-up ring in the seating surface is shorter than a length from an outer circumferential surface of the fuel introducing portion in the end surface to an inner circumferential surface of the mounting portion.

3. The sealing structure according to claim 1, wherein the fuel introducing portion includes a tapered portion having a diameter gradually increased from an upstream side of a fuel flow passage toward the end surface of the connection portion, and the angle defined between the pressure-receiving surface of the back-up ring and the inner circumferential surface of the back-up ring is smaller than the angle defined between the pressure-receiving surface and the outer circumferential surface in the tapered portion.

4. The sealing structure according to claim 1, wherein the outer diameter of the back-up ring is gradually decreased from the pressure-receiving surface toward the seating surface, and the outer diameter of the back-up ring in the pressure-receiving surface is smaller than the inner diameter of the mounting portion.

5. The sealing structure according to claim 1, wherein the back-up ring includes an inner-circumferential stepped portion at a portion of the inner circumferential surface, the portion being located closer to the seating surface than the pressure-receiving surface is, the inner-circumferential stepped portion being recessed toward the outer circumferential surface of the back-up ring.

6. The sealing structure according to claim 4, wherein the back-up ring includes an outer-circumferential stepped portion at a portion of the outer circumferential surface, the portion being located closer to the seating surface than the pressure-receiving surface is, the outer-circumferential stepped portion being recessed toward the inner circumferential surface of the back-up ring.

7. The sealing structure according to claim 4, wherein the back-up ring includes:

an inner-circumferential stepped portion at a portion of the inner circumferential surface, the portion being located closer to the seating surface than the pressure-receiving surface is, the inner-circumferential stepped portion being recessed toward the outer circumferential surface of the back-up ring; and an outer-circumferential stepped portion at a portion of the outer circumferential surface, the portion being located closer to the seating surface than the pressure-receiving surface is, the outer-circumferential stepped portion being recessed toward the inner circumferential surface of the back-up ring.

8. The sealing structure according to claim 1, wherein the back-up ring includes a slit extending from the pressure-receiving surface through the seating surface, and the slit is inclined relative to the central axis.

9. The sealing structure according to claim 2, wherein the back-up ring includes an outer-circumferential stepped portion at a portion of the outer circumferential surface, the portion being located closer to the seating surface than the pressure-receiving surface is, the outer-circumferential stepped portion being recessed toward the inner circumferential surface of the back-up ring.

10. The sealing structure according to claim 2, wherein the back-up ring includes a slit extending from the pressure-receiving surface through the seating surface, and the slit is inclined relative to the central axis.

* * * * *